United States Patent [19]

Rapoen

[11] Patent Number: 4,897,640
[45] Date of Patent: Jan. 30, 1990

[54] METHOD AND ELECTRICAL CIRCUIT FOR THE RELIABLE DETECTION OF PROCESS STATES WITHIN FREELY COUPLABLE UNITS

[75] Inventor: Klaus Rapoen, Berlin, Fed. Rep. of Germany

[73] Assignee: Licentia Patent-Verwaltungs-GmbH, Frankfurt am Main, Fed. Rep. of Germany

[21] Appl. No.: 189,175

[22] Filed: May 2, 1988

[30] Foreign Application Priority Data

Apr. 30, 1987 [DE] Fed. Rep. of Germany ....... 3714960

[51] Int. Cl.$^4$ ......................... G05B 23/02; B60L 15/42
[52] U.S. Cl. ............................. 340/825.160; 371/11.3; 246/28 F
[58] Field of Search .............. 340/825.05, 507, 825.16; 370/86, 13-15; 371/22, 11; 307/10 R; 246/28 F; 379/1, 5, 27

[56] References Cited

U.S. PATENT DOCUMENTS

| | | | |
|---|---|---|---|
| 4,627,055 | 12/1986 | Mori et al. ............................. | 371/11 |
| 4,651,317 | 3/1987 | Tashiro et al. ........................ | 370/86 |
| 4,656,586 | 4/1987 | Ochiai et al. ....................... | 246/28 F |
| 4,777,330 | 10/1988 | Nakayashiki et al. ............ | 178/69 R |

FOREIGN PATENT DOCUMENTS 0122007 10/1984 European Pat. Off. .............. 371/11

Primary Examiner—Donald J. Yusko
Assistant Examiner—Yuk H. Lau
Attorney, Agent, or Firm—Spencer & Frank

[57] ABSTRACT

An arrangement for reliably detecting process states within freely couplable units each controlled by a computer. Each one of n couplable units forms its own internal signal current loop including a controllable current source and at least two current detection members and series connected process contacts actuated by the process. If a plurality of such units are coupled together, the internal signal current loops of these units are electrically separated and common signal current loops are formed for identical processes so as to pass through all units. Each current source belonging to a unit and its current detection members can be bridged by a subloop which can be activated for test purposes by means of a switch, with the position of the switch being monitored with respect to safety by predetermined tests employing additional, position specific current loops.

14 Claims, 2 Drawing Sheets

METHOD AND ELECTRICAL CIRCUIT FOR THE RELIABLE DETECTION OF PROCESS STATES WITHIN FREELY COUPLABLE UNITS

BACKGROUND OF THE INVENTION

The present invention relates to an arrangement for the reliable detection of process states within freely couplable units, each controlled by a computer, the arrangement employing signal current loops and check tests. The computers are to be suitable for redundant operation, i.e. it should be possible to couple them together without the computers influencing one another.

According to a basic principle of control technology, safety monitoring is performed in a residual current process. For this purpose, a signal current loop is formed. Any interruption of the current is interpreted as a malfunction and causes, for example, a relay to trip, thus giving a signal and possibly causing the system to be switched off.

For units to be coupled together, which may, for example, be vehicles such as train cars, signal loops are conducted through all vehicles to ensure safety. All emergency switches or emergency brake switches or door locks or coupling contacts, etc. in the form of separate loops may be connected in series in such a circuit. The current is fed in and returned to, for example, the driver's cab. If one of these process switches is thrown, the vehicle is stopped.

In a group of vehicles which may be a variable number of different vehicles, often without their own driver's cabs, feed problems exist, particularly in redundant systems where the computer of one vehicle is to take over the control functions for another and in which, for the proper operation of the entire system (e.g. a train), when there is a malfunction in one vehicle, all vehicle units operate in parallel.

In failsafe computer systems which are relied upon to give the proper signals the proper operation of the computer must be additionally monitorable by constant tests and it must be possible to uncouple (separate) it from the process. For this purpose, it is known to control a loop extending through several vehicles from only one computer. If this computer switches the process off, for example in order to make on-line tests to check the system, there no longer is any process information. If the other vehicles also have their own computer on board, the signals from the other computers are at least interfered with and the compilation of data is impaired. Another drawback is that only the controlling computer is able to perform on-line tests.

SUMMARY OF THE INVENTION

It is the purpose of the present invention to overcome the described drawbacks. The object is to reliably detect safety relevant process states in systems which are coupled (connected) together by a plurality of computers without influencing the total system if one computer is malfunctioning or is switched off. On-line tests should be possible without interrupting the general data compilation. If one computer is missing (in redundance operation) interruption-free switching must establish a truly parallel operation in which important functions of the malfunctioning vehicle are temporarily performed by another computer.

This is accomplished by the present invention in which an arrangement is provided for reliably monitoring process states within freely couplable units, each controlled by a computer, the arrangement employing signal current loops and check tests, and in which each one of n couplable units forms its own internal signal current loop including a controllable current source and at least two current detection members and series connected process contacts actuated by the process. If a plurality of such units are coupled together, the internal signal current loops of these units are electrically open and common signal current loops are formed for identical processes so as to pass through all units. Each current source belonging to a unit, including its current detection members can be bridged by a subloop which can be activated for test purposes by means of a switch, with the position of the switch being monitored with respect to safety by special tests employing additional, position specific current loops.

BRIEF DESCRIPTION OF THE DRAWINGS

The invention will be described in greater detail below with reference to the appended schematic illustrations in which.

DESCRIPTION OF THE PREFERRED EMBODIMENT

Figure 1:
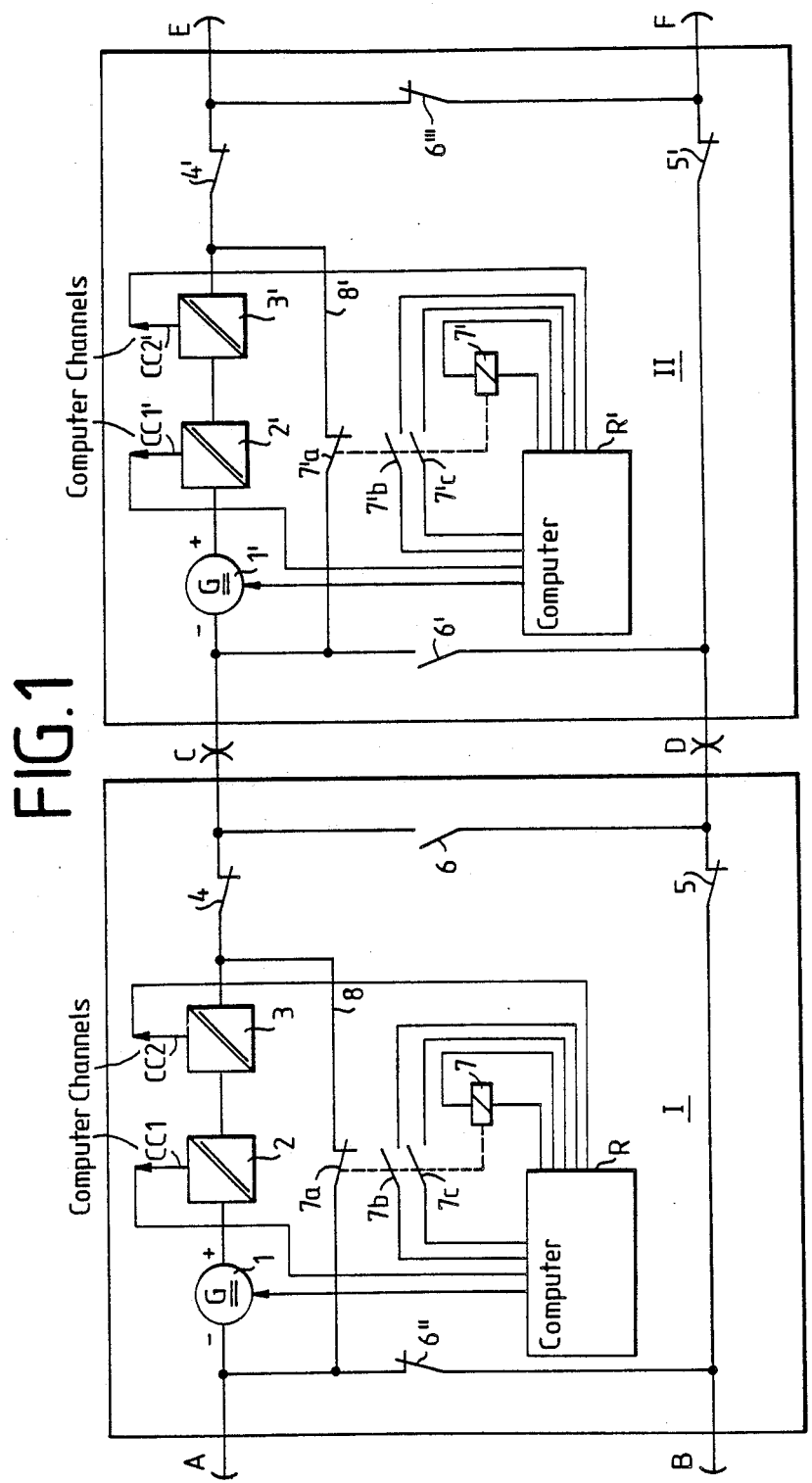
FIG. 1 shows the electrical coupling between two cars of a train.

FIG. 1 shows a train composed of two coupled units, here cars I and II. Each car which is controlled by its own fail-safe on-board computer, is provided with a number of electrically separated signal current loops corresponding to the number of processes to be monitored, i.e. covered. However, for the sake of clarity only one such signal current loop is shown. In the respective cars I and II, each of these loops contains, as its essential elements, respective low internal resistance current sources 1 and 1' (e.g. 15 mA at a maximum of 30 V), which are controlled for respective computers R and R' and separated from the electrical network of the car with respect to voltage, and two like voltage separated current detection members 2 and 3, and 2' and 3', respectively. The detection members provide monitoring signals to separate computer channels (CC1 and CC2 for detection members 2 and 3, CC1' and CC2' for detection member 2' and 3'). The signal current loop of each car also includes process signal contacts, here, for example, emergency switch contacts 4, 5 for car I, emergency switch contacts 4', 5' and car II.

When the cars are mechanically coupled, the signal current loops of each individual car are electrically separated and a common signal current loop is created by switching. The number of coupled cars ultimately determines the size of the signal current loop; this size is limited in view of the series connected current sources (voltage summation).

When coupling the illustrated cars I and II, the necessary switching of the signal current loop is effected by signal relays not shown in the drawings.

These relays have positively mechanically controlled contacts 6, 6' whose switch positions—shown open—are securely monitored. The corresponding contacts 6'' and 6''' at the beginning and end of the train are shown closed. In principle, direct mechanical switches may of course also be used at the coupling points.

In the present case, there results a signal current loop consisting in succession of

1+, 2, 3, 4, C, 1', 2', 3', 4', 6''', 5', D, 5, 6'', 1−.

The process must act on the signal loop in such a manner that the event to be signalled reliably interrupts the current loop with respect to its signalling operation. Either of the following variations are conceivable for the configuration of the signal contacts (switches):

1. a contact (switch) which is forced open by the process; or
2. two series-connected contacts (switches) which monitor the process independently of one another.

In the second variation, here the operation of both contacts (switches) 4, 5(4',5') must then be checked within the malfunction disclosure time (AOZ) of the signalling device. To determine the malfunction disclosure time, both contacts 4, 5 (4', 5') and their actuating mechanisms are considered as one unit under observation. In this connection it is assumed to be certain that, after completion of an operational check of the two individual contacts and their actuating mechanisms, at least one contact 4 or 5 (4' or 5') interrupts the current loop within the malfunction disclosure time if a process event occurs.

The malfunction disclosure time AOZ is here defined according to guidelines issued by the German Federal Railway System as 1/1000 of the mean time between failures MTBF. Safety regulations require that the two switches 4 and 5 as well as 4' and 5', respectively, be checked for proper operation during an interval of the length of the AOZ so that jamming can be detected and corrected.

Evaluation is made by current detection members 2, 3 and 2', 3', respectively, which are independent of one another and of the other signal loops. Optocouplers, for example, can be used here to advantage. The output signals of the current detection members are each conducted to the associated computer channels CC1, CC2 and CC1', CC2' of the onboard fail-safe computer. The signals from the current loops to the respective computers are valid as process reports only if a positively mechanically guided signal evaluation relay 7 (7') has been tripped under control of the computer R (R'), i.e. rest contact 7a (7'a) is open. The command to open it is given by the computer R (R') with a signal "Signal Evaluation On", but the position of signal evaluation relay 7 (7') must be monitored. This is done in each case in two separate current loops by way of their own positively controlled operating contacts 7b and 7c in the case of car I and 7'b and 7'c in the case of car II. Emergency switch contacts 4 and 5 in the case of car I and 4' and 5' in the case of car II, as signal contacts for the process, are advisably configured as forced break (release) contacts (VDE 0113), i.e. they are forced to open as a function of the process. If such a signal contact opens, current detection members 2, 3 or 2', 3' send a "0" signal through channels CC1 and CC2 or CC1' and CC2' to inform the respective on-board computer which then actuates, for example, the brakes.

VDE 0113 is the DIN standard No. 0113 set by the Verband Deutscher Elektrotechniker. [Association of German Electrical Engineers]. This standard defines the proper and improper configurations of positively (mechanically) guided contacts.

In the rest state of signal evaluation relay 7, (7') i.e. once it has been switched off, contact 7a (7'a) is closed. This produces a short circuit and causes a subloop 8 (8') to be formed via current source 1 (1') and current detection members 2, 3, (2', 3'), with this subloop being independent of the process. In this state, on-line tests are made at different times for each car. This does not interfere with the process evaluation in the respectively other car (here, for example, car II). By switching in and out a current source 1 under control of the computer R, it is possible to monitor the operation of failsafe signal detection. Where there are multiple processes being evaluated for each car, car I, for example, "n" separate subloops 8 with "n" separate contacts 7a are required for each process, but only one common relay 7 and one pair of contacts 7b, 7c is required, all processes being tested during the time that the contacts 7b, 7c are open.

Within computer on-line tests, the input for the failsafe signals within the malfunction disclosure time (AOZ) can also be checked. This check includes a check of the evaluation circuit for the current loops (optocouplers) and the data paths of input cards (interface) of the computer. The test recognizes "stuck at 1" (dangerous), "stuck at 0" (not dangerous) and pull-along effects between any two input bits of a respective channel. During the test, no process states can be obtained.

"Stuck at one" and "stuck at zero" respectively, indicate faulty "dwelling" of electronic components at logic 1 or logic zero, respectively. If bits combined into bytes are fed to electronic components, inner couplings may undesirably pull along one or the other bit. These phenomena are called "pull-along effects".

"Input cards" are plug-in cards for computer interfaces to connect them with peripherals. The signals are obtained at the ports.

Failsafe are all signals and systems which, upon the occurrence of any type of fault, produce a non-dangerous system state.

With the aid of the "Signal Evaluation On" signal, a selection can be made between on-line test operation and process monitoring. The monitoring of the instruction "Signal Evaluation On", i.e. the position of signal evaluation relay 7 (7') which is responsible for the safety of the system must, however, be additionally reliably monitored. This is done by way of a reliability signal input via contact 7b (7'b) and contact 7c (7'c). These reliability signals are subject to a special on-line test performed during process compilation.

Figure 2:
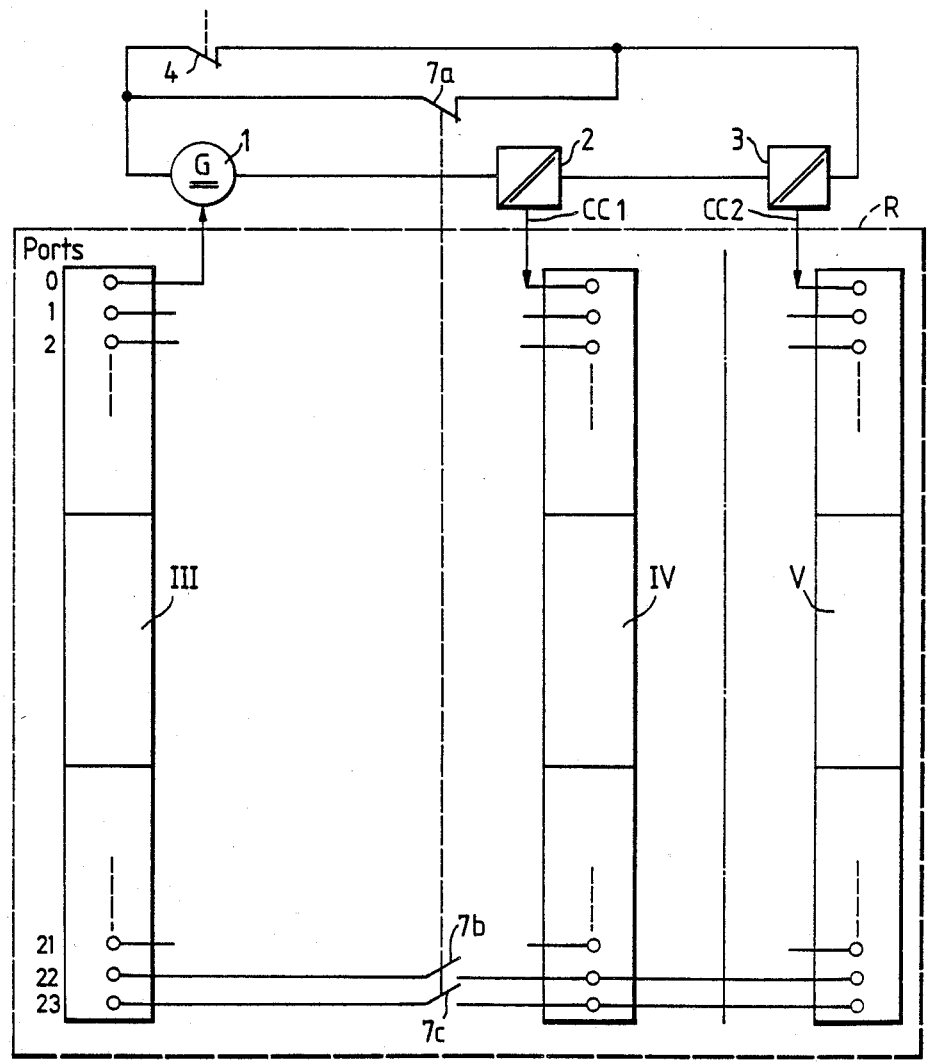
FIG. 2 is a function scheme.

FIG. 2 is a function scheme of the process when the relay 7, as applied to train car I, for example, is coupled to the on-board computer.

The on-line tests are performed by way of a computer output card III (interface) of computer R (one computer channel CC1 or CC2 is sufficient) for, for example, 24 test outputs (to ports 0 to 23) after the various processes have been coupled out and subloops have been formed by way of switches 7a, 7'a.

As shown here for port 0, the respective current sources 1 for all processes of a particular car I are actuated with a logic 1 according to a covering test pattern and the associated current detection members 2, 3 must simultaneously and equivalently cover this pattern and forward it to the two input cards IV, V of computer R for the two computer channels CC1 and CC2 where the bit pattern must be reliably recognized again. The test outputs (single channel) themselves are not failsafe. These test outputs feed the process signal loops for up to 22 such loops via current sources 1 and form AND linkages with the processors. To obtain process states, the test outputs must be at "1", i.e. the first 22 ports (0 to 21) must emit a "1" to be fed to a corresponding process signal loop. Moreover, the computer must put out the nonfailsafe signal "Signal Evaluation On" to actuate relay 7 (see FIG. 1). Additionally, the two remaining test ports (ports 22 and 23) are given a predetermined sequence of signals. While ports 0 to 21 emit a fixed "1" during the process monitoring process, an alternating sequence of "1" and "0" appears at ports 22 and 23 with a keying ratio of 2 : 1 (artificial dynamization). Ports 22 and 23 are here always antivalent, i.e. if port 22 emits a "1", port 23 emits a "0" and vice versa. The clock period may lie between a few milliseconds and several seconds. If the emitted alternating clock pulse is no longer recognized from the input into the computer during the return signal via contacts 7b and 7c, all failsafe inputs are invalid.

The present invention therefore ensures failsafe process monitoring in a simple manner.

The present disclosure relates to the subject matter disclosed in Federal Republic of Germany Patent Application No. P 37 14 960.1, filed April 30th, 1987, the entire specification of which is incorporated herein by reference.

It will be understood that the above description of the present invention is susceptible to various modifications, changes and adaptations, and the same are intended to be comprehended within the meaning and range of equivalents of the appended claims.

What is claimed is:

1. An arrangement for monitoring states of a process within freely couplable units, comprising:
    a plurality of internal signal current loops, at least a corresponding one of which is internal to each of the units, each loop including a controllable current source and at least associated current detectors and series connected switches actuated by the process;
    means for opening said internal signal current loops when the units are coupled together, and forming a closed common signal current loop passing through all of the coupled units, said common loop having the series connected switches and current sources therein and having the current detectors therein, so as to be actuated by the process;
    a plurality of subloops, each subloop corresponding to one of said controllable current sources and bridging the current source and associated current detectors, each subloop having switch means for actuating the subloop so that the subloop current in the subloop is defined by the respective current source; and
    means for monitoring said switch means, said monitoring means including means, having additional, position specific current loops, for monitoring said switch means by predetermined tests employing said additional, position specific current loops.

2. An arrangement as in claim 1, wherein each subloop comprises means for bypassing common loop current around the current source and associated current detectors and through the switch means when said subloop is actuated by said switch means.

3. An arrangement as in claim 1, further comprising computer means for controlling the switch means and the current source for each internal loop to provide a predetermined subloop current in each subloop when the subloop is actuated by the switch means.

4. An arrangement as in claim 1, further comprising for each unit, a computer means and two positively guided operational switches in said position specific current loops and a positively controlled signal evaluation relay, responsive to a signal evaluation signal from said computer means, for closing said switch means and opening said position specific current loops so as to perform said predetermined tests.

5. An arrangement as in claim 4, further comprising an evaluation circuit, said computer means including input card, wherein said monitoring means includes means for performing the predetermined tests as on-line tests, the on-line tests including tests of the evaluation circuit and data paths of the input cards.

6. An arrangement for monitoring states of processes within each of a plurality of freely couplable units, comprising:
    pluralities of internal signal current loops, internal to respective ones of the units, each loop internal to one of the units being associated with a respective one of the processes and including a controllable current source and at least associated current detectors and series connected switches actuated by the respective process;
    means for opening said internal signal current loops when the units are coupled together and forming closed common signal current loops associated with a respective one of the processes and passing through all of the coupled units, said common loops each having the series connected switches and the current sources therein, and having the current detectors therein so as to be actuated by the associated process;
    a plurality of subloops, each subloop corresponding to one of said controllable current sources and bridging the current source and associated current detectors, each subloop having source and associated current detectors, each subloop having switch means for actuating the subloop so that the subloop current in the subloop is defined by the respective current source; and
    means for monitoring the switch means, said monitoring means including means, having additional position specific current loops, for monitoring said switch means by predetermined tests employing said additional, position specific current loops.

7. A method of performing tests on an arrangement for monitoring states of processes within each of a plurality of freely couplable units, the arrangement comprising pluralities of internal signal current loops, internal to respective ones of the units, each loop internal to one of the units being associated with a respective one of the processes and including a controllable current source and at least associated current detectors and series connected switches actuated by the respective process; means for opening said internal signal current loop when the units are coupled and forming closed common signal current loops associated with a respective one of the processes and passing through all of the coupled units, the common loops each having the series connected switches and the current sources therein, and having the current detectors therein so as to be actuated by the associated process; a plurality of subloops, each subloop corresponding to one of the controllable current sources and bridging the current source and associated current detectors, each subloop having switch means for actuating the subloop so that the subloop current in the subloop is defined by the respective current source; and means for monitoring the switch means, the monitoring means including means, having additional, position specific current loops, for monitoring the switch means by predetermined tests employing said additional, position specific current loops, the method comprising the steps of:

performing the predetermined tests on-line with respect to specific subloops during process compilation of associated processes; and while performing the predetermined tests, feeding a fixed continuous logic signal to the current sources so that the current sources provide current to the respective subloops, and supplying the two additional current loops with clock pulses in dynamically alternating sequences of logic 1's and 0's which must be recognized, from two alternating working non-failsafe outputs of the computer.

8. A method as in claim 7, wherein the two additional current loops are fed with the dynamically alternating sequences of logic 1's and 0's with a keying ratio of 1:1.

9. A method as in claim 8, wherein the clock pulses have a period which is adjustable and lies in the range of a few milliseconds and several seconds.

10. A method as in claim 8, further comprising the step of adjusting the clock pulses to have a period in the range of a few milliseconds to several seconds.

11. A method as in claim 7, wherein the clock pulses have a period which is adjustable and lies in the range of a few milliseconds and several seconds.

12. A method as in claim 7, further comprising the step of adjusting the clock pulses to have a period in the range of a few milliseconds to several seconds.

13. A method as in claim 7, including the step of:

while performing an on-line test with the computer, activating the associated subloop periodically to take the associated unit out of process compilation with respect to the associated process and testing by way of the subloop and the controllable current source therein, the failsafe signals within the malfunction disclosure time without influencing the process compilation and the on-line test of further coupled units.

14. A method as in claim 13, wherein the on-line test also includes testing of an evaluation circuit including the respective detector members and current source, and data paths of input cards of the computer.

* * * * *